United States Patent [19]
Honda

[11] Patent Number: 6,052,199
[45] Date of Patent: Apr. 18, 2000

[54] PRINTER CONTROL DEVICE AND A METHOD OF CONTROLLING A PRINTER

[75] Inventor: Masato Honda, Nisshin, Japan

[73] Assignee: Brother Kogyo Kabushiki Kaisha, Nagoya, Japan

[21] Appl. No.: 08/744,152

[22] Filed: Nov. 12, 1996

[30] Foreign Application Priority Data

Nov. 10, 1995 [JP] Japan ..................................... 7-317422

[51] Int. Cl.[7] ........................... B41B 15/00; H04N 1/419; H04N 1/411; H04N 1/00
[52] U.S. Cl. ....................... 358/1.16; 358/1.16; 358/1.17; 358/261.1; 358/261.4; 358/404; 358/444
[58] Field of Search .................................... 395/115, 116, 395/112, 110, 113, 114; 364/518–523; 358/404, 444, 261.1, 261.4, 428, 433

[56] References Cited

U.S. PATENT DOCUMENTS

| | | | |
|---|---|---|---|
| 3,823,389 | 7/1974 | Heitman et al. ........................ | 395/115 |
| 4,954,968 | 9/1990 | Yamaguchi et al. ..................... | 395/112 |
| 5,541,737 | 7/1996 | Oguro et al. ............................. | 358/335 |
| 5,604,846 | 2/1997 | Kadota .................................... | 394/114 |

*Primary Examiner*—Edward L. Coles
*Assistant Examiner*—Twyler Lamb
*Attorney, Agent, or Firm*—Oliff & Berridge, PLC

[57] ABSTRACT

A printer control device capable of performing a buffer memory clearing operation within a short period of time without complicating the control of the clearing operation. A RAM 8 stores an end address of an immediately preceding block of print data. CPU 6 develops a present block of print data received from a host computer into a buffer memory 8*a* so as to overwrite it on the immediately preceding block of print data which has been stored in the buffer memory 8*a*. When an end address of the present block of print data developed into the buffer memory 8*a* is smaller than the end address stored in the RAM 8, storage locations of the buffer memory 8*a* from the end address of the present block of print data to the end address stored in the RAM 8 are cleared. Then, the end address stored in the RAM 8 is replaced with the end address of the present block of print data.

18 Claims, 4 Drawing Sheets

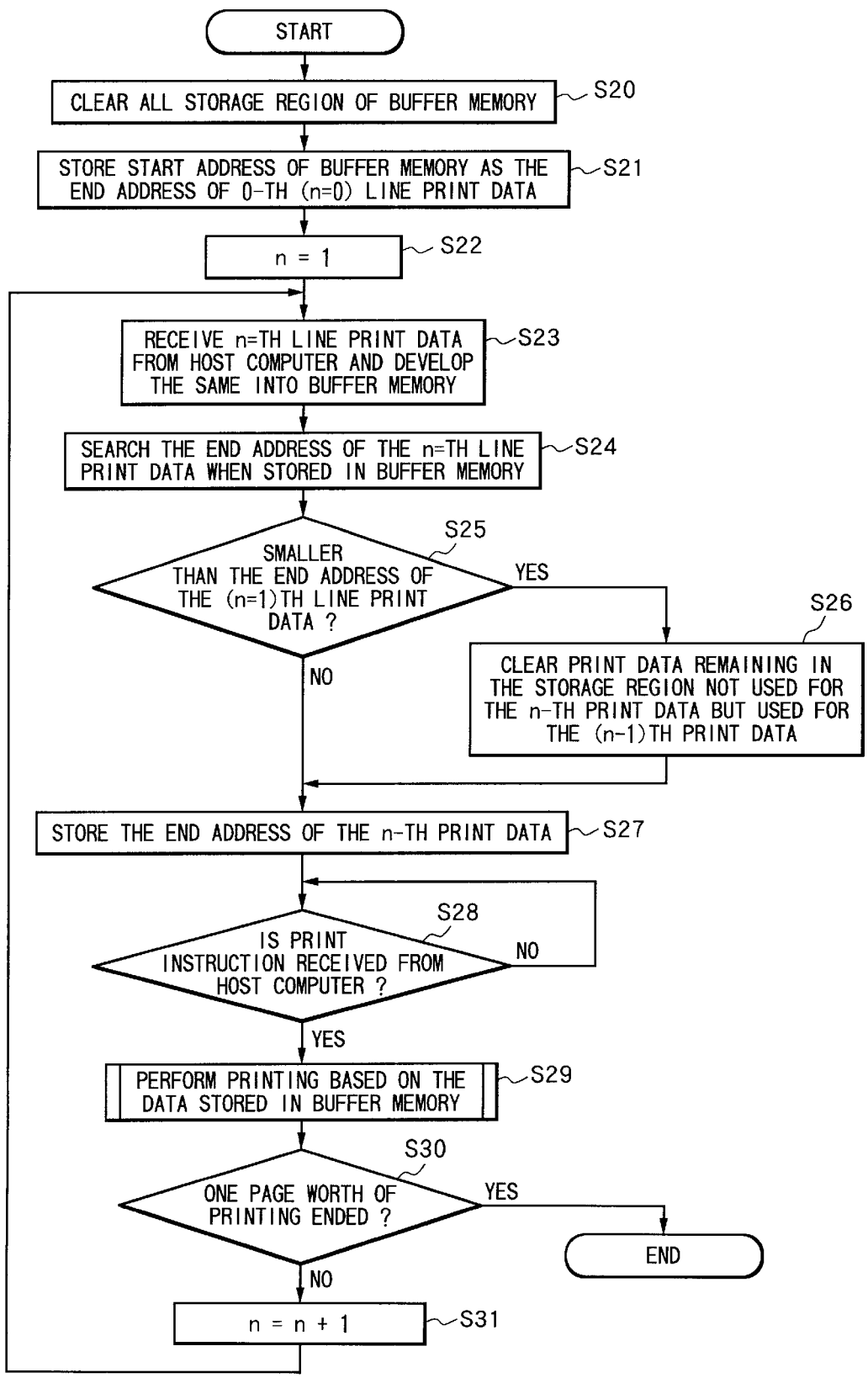

PRINTER CONTROL DEVICE AND A METHOD OF CONTROLLING A PRINTER

BACKGROUND OF THE INVENTION

1. Field of the Invention

The present invention relates to a printer control device having an improved clearing capability for cleaning a buffer memory into which print data received from a host computer is developed. The invention also relates to a method of controlling a printer to effectively clear the buffer memory.

2. Description of the Related Art

Conventionally, a printer control device does not develop newly received print data into a buffer memory until a part or whole of the storage region of the buffer memory into which previous print data is developed is not cleared. The buffer memory clearing operation is necessary to prevent the previous print data from being printed together with the new print data. A part of the previous print data will be printed if it remains in a region of the buffer memory where the new print data does not extend.

It takes a relatively long period of time to clear the whole region of the buffer memory or a part of the buffer memory into which the previous print data was developed precedent to the development of new print data. Increasing the speed of cleaning operation requires a complicated control. Therefore, it is difficult to increase throughput.

SUMMARY OF THE INVENTION

The present invention has been made to solve the above-mentioned problems, and accordingly it is an object of the present invention to provide a printer control device capable of performing a buffer memory clearing operation within a short period of time without complicating the control of the clearing operation.

It is another object of the present invention to provide a method of controlling a printer to effectively carry out the buffer memory clearing operation.

To achieve the above and other objects, there is provided a printer control device including a buffer memory for storing print data received from a host computer on a block-by-block basis wherein a present block of print data received from a host computer following a previous block of print data is overwritten on the previous block of print data, and clearing means for clearing a part of the previous block of print data which remains unerased as a result of overwrite of the present block of print data on the previous block of print data.

The clearing means may clear storage locations of the buffer memory which remain unused by the present block of print data.

There may further be provided determining means for determining whether or not there exists the part of the previous block of print data which remains unerased as a result of overwrite of the present block of print data on the previous block of print data, and control means for controlling the clearing means so as to be deactivated when the determining means determines that there does not exist the part of the previous block of print data which remains unerased.

According to another aspect of the present invention, there is provided a printer control device that includes a first memory, a second memory, and control means. The first memory has predetermined storage locations assigned with consecutively increasingly numbered addresses from a start address to an end address. Print data is received from a host computer on a block-by-block basis. A block of print data is developed into the first memory sequentially from the start address of the first memory. The second memory stores an end address of an immediately preceding block of print data developed into the first memory. The immediately preceding block of print data is received from the host computer immediately preceding a present block of print data. The control means controls the first memory so that when an end address of the present block of print data developed into the first memory is smaller than the end address stored in the second memory, at least storage locations of the first memory from the end address of the present block of print data to the end address stored in the second memory are cleared. The control device further controls the second memory so that the end address stored in the first memory is replaced with the end address of the present block of print data.

When the end address of the present block of print data developed into the first memory is equal to or larger than the end address stored in the second memory, the control means carries out printing based on the present block of print data stored in the first memory without clearing the storage locations of the first memory.

Initial setting means may further be provided for initially setting the second memory to store the end address of the first memory as the end address of the immediately preceding block of print data so that determination can be made as to whether or not an end address of a firstly received block of print data is smaller than the end address stored in the second memory.

The initial setting means may initially set the second memory to store the start address of the first memory as the end address of the immediately preceding block of print data. By doing so, when the first block of print data is developed into the first memory, a clearing operation becomes unnecessary. Block of print data may be one line worth of print data or one page worth of print data.

When the end address of the present block of print data is smaller than the end address stored in the second memory, the control means may clear storage locations of the first memory which remain unused by the present block of print data.

According to still another aspect of the present invention, there is provided a method of controlling a printer, comprising the steps of (a) storing in a buffer memory print data received from a host computer on a block-by-block basis in such a manner that a present block of print data received from a host computer following a previous block of print data is overwritten on the previous block of print data; and (b) clearing a part of the previous block of print data which remains unerased as a result of overwrite of the present block of print data on the previous block of print data. Step (b) may clear storage locations of the buffer memory which remain unused by the present block of print data. The method may further comprise the steps of (c) determining whether or not there exists the part of the previous block of print data which remains unerased as a result of overwrite of the present block of print data on the previous block of print data; and (d) skipping clearing operation when step (c) determines that there does not exist the part of the previous block of print data which remains unerased.

BRIEF DESCRIPTION OF THE DRAWINGS

The particular features and advantages of the invention as well as other objects will become more apparent from the following description taken in connection with the accompanying drawings, in which:

FIG. 4 is a flowchart illustrating a print data processing according to a second embodiment of the present invention.

DETAILED DESCRIPTION OF THE PREFERRED EMBODIMENTS

Figure 1:
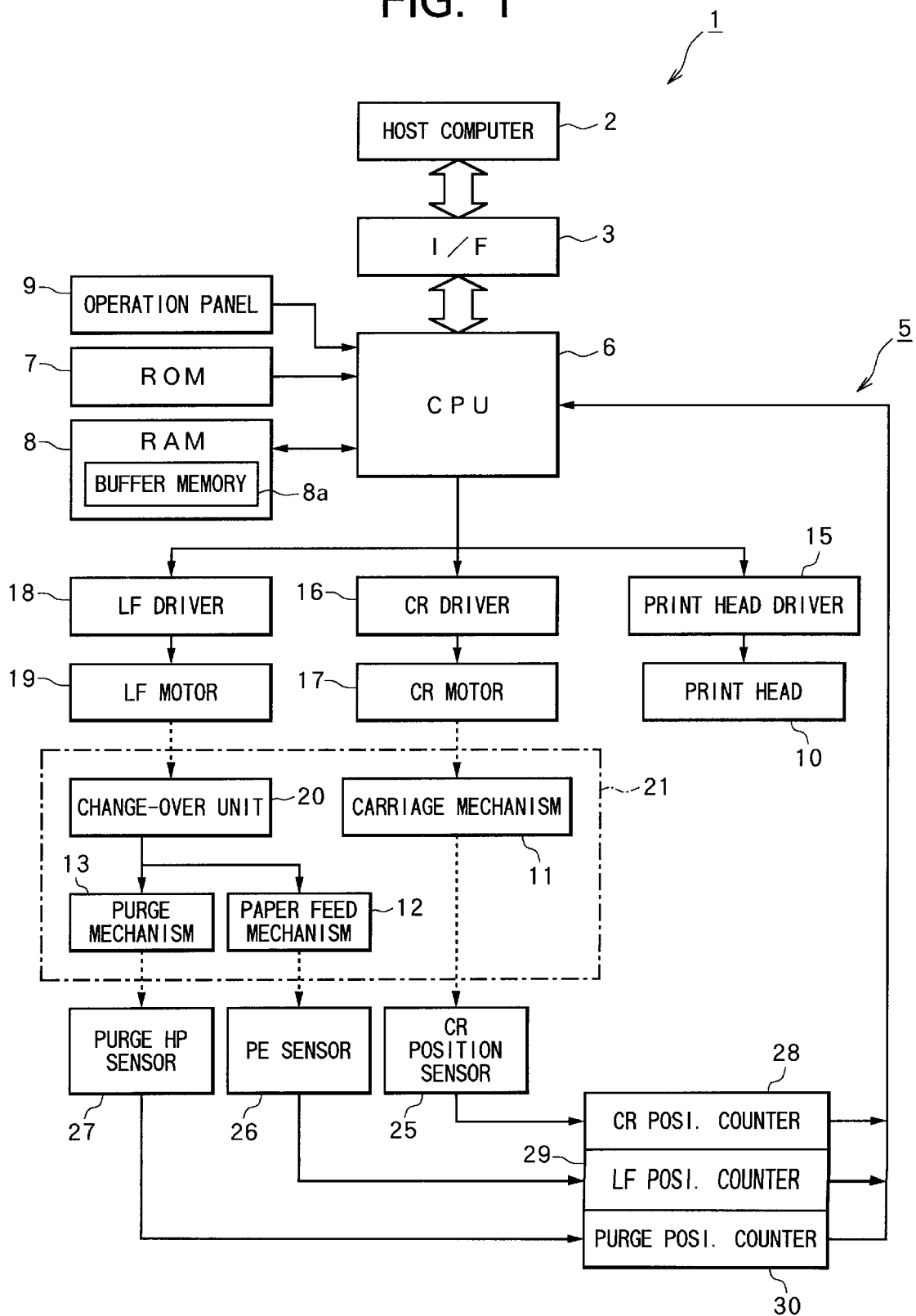
FIG. 1 is a block diagram showing a printer control device according to a preferred embodiment of the present invention.

Preferred embodiments of the present invention will be described with reference to the accompanying drawings. FIG. 1 shows a block diagram of a printer system embodying a printer control device of the present invention.

The printer system 1 includes a host computer 2 and a printer 5 incorporating a printer control device. The printer control device controls printing operation based on print data received from the host computer 2 through an interface (I/F). The printer control device includes a central processing unit (CPU) 6 that governs the entire control of the printer 5, a read-only memory (ROM) 7 storing programs for executing various jobs, and a random access memory (RAM) 8. A part of the storage area of the RAM 8 is used as a buffer memory 8a. An operation panel 9 is connected to the CPU 6 for entering external instructions thereto.

The printer 5 further includes a print head 10 that performs printing on a print paper, a carriage mechanism 11 mounting the print head 10 thereon to reciprocally move the same relative to print paper, a paper feed mechanism 12 for feeding the print paper, and a purge mechanism 13 for cleaning the print head 10. The print head 10 is controlled by the CPU 6 through a print head driver 15. The carriage mechanism 21 is driven by a carriage (CR) motor 17 that is controlled by the CPU 6 through a carriage (CR) driver 16. Both the paper feed mechanism 12 and the purge mechanism 13 are driven by a line feed (LF) motor 19 that is controlled by the CPU 6 through a line feed (LF) driver 18. The paper feed mechanism 12 and the purge mechanism 13 use the LF motor 19 as a common drive source. Specifically, the mechanisms 12 and 13 are selectively driven by the LF motor 19 by virtue of a change-over unit 20. The carriage mechanism 11, paper feed mechanism 12, purge mechanism 13 and the change-over unit 20 are a mechanical portion 21 of the printer 5. Operations of various parts in the mechanical portion 21 are detected by various sensors including a carriage position sensor 25, paper empty (PE) sensor 26, and purge head position (HP) sensor 27. Detection signals output from those sensors are input to the CPU 6 through the corresponding counters, i.e., carriage (CR) position counter 28, line feed (LF) position counter 29, and purge position counter 30.

Next, print data process in the printer system 1 thus arranged will be described. The CPU 6 receives print data (dot data) from the host computer 2 on a line-by-line basis and develops it into the buffer memory 8a. The buffer memory 8a has a capacity capable of developing one line worth of print data to be printed, for example, on an A4 size paper. The CPU 6 then stores in the RAM 8 the end address of an area of the buffer memory 8a into which the print data is developed. Thereafter, the CPU 6 reads the print data from the buffer memory 8a and drives the print head 10 based on the print data thus read while moving the carriage on which the print head 10 is mounted.

When the print data for the next line is transmitted from the host computer 2, the CPU 6 develops the print data into the buffer memory 8a in such a manner that the print data is overwritten on the previous print data from the start address of the buffer memory 8a. When the previous print data remains in the buffer memory 8a in addresses beyond the end address of the present print data as a result of overwrite of the present print data, the CPU 6 clears the previous print data remaining in the buffer memory 8a. The end address of the previous print data that has been stored in the RAM 8 is replaced with the end address of the present print data.

Figure 2:
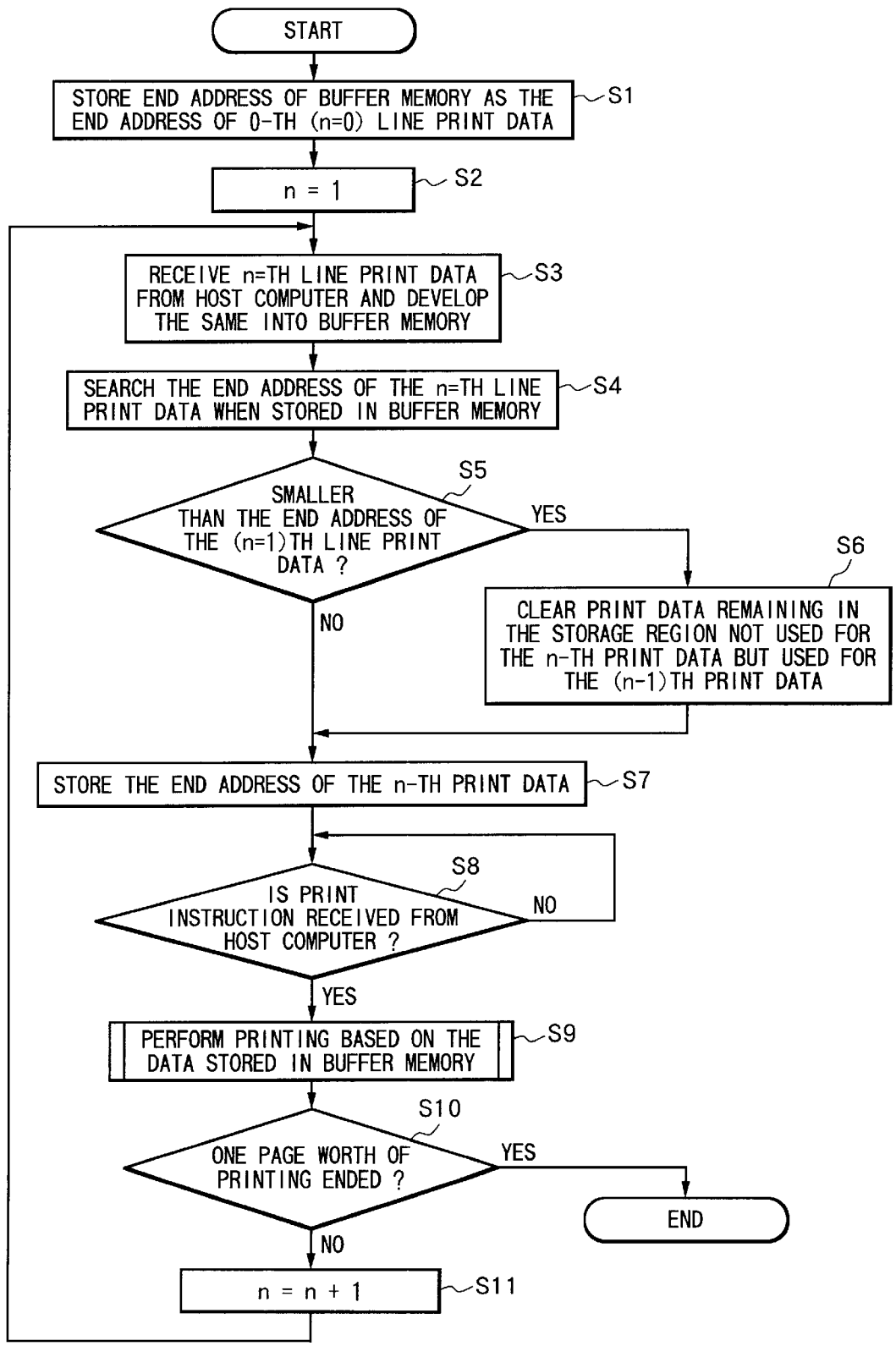
FIG. 2 is a flowchart illustrating a print data processing according to a first embodiment of the present invention.
Figure 3:
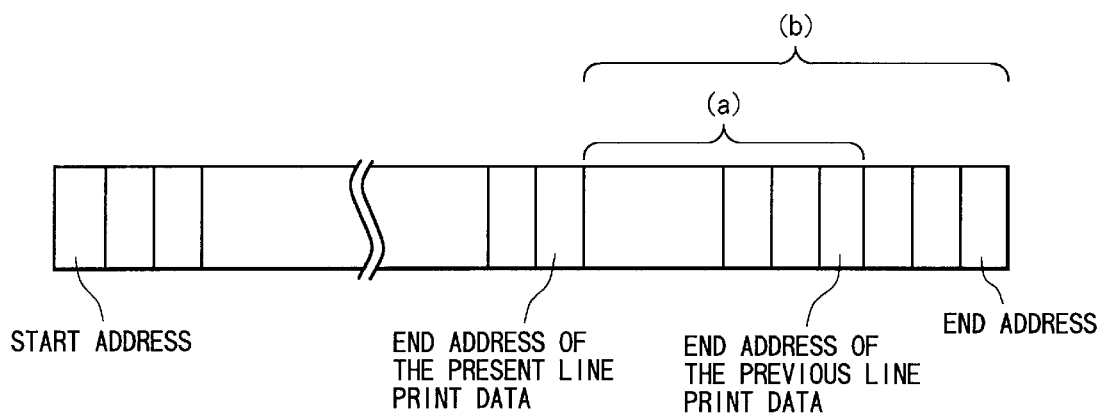
FIG. 3 is an explanatory diagram illustrating a storage region of a buffer memory subject to clearing operation.

The clearing operation of the unwanted print data will be described in far more detail with reference to FIGS. 2 and 3. FIG. 2 is a flowchart illustrating a routine for performing the clearing operation. FIG. 3 schematically shows the region of the buffer memory 8a which is to be cleared in the processing in S6 of the FIG. 2 flowchart.

When the printer 5 is powered and placed in an idling condition capable of accepting the print data from the host computer 2, the end address of the buffer memory 8a is stored in the RAM 8 (S1). The end address stored therein virtually indicates the end address of the 0-th (n=0) line print data. More specifically, when the 1st line print data, that is initially transmitted from the host computer 2, is to be developed into the buffer memory 8a, the end address of the previous print data needs to be provided in order to determine the storage region to be cleared. For this reason, initial setting is performed to store the end address of the buffer memory 8a as the end address of the previous data.

When the 1st line (n=1) print data is received from the host computer 2, the CPU 6 develops the print data into the buffer memory 8a (S2, S3). Next, the end address of the 1st line print data is searched (S4) and determination is made as to whether or not the end address of the present line print data is smaller than that of the previous line ((n−1)th line) print data (S5). When the end address of the present line print data is smaller than that of the previous line print data (S5: Yes), the storage region of the buffer memory 8a which remains unused in storing the present line print data but was used for the previous line print data, is cleared (S6). The storage region to be cleared is indicated by (a) in the diagram of FIG. 3. For the 1st line print data, clearing operation is performed with respect to the storage region of the buffer memory 8a in a region from the end address of the 1st line print data to the end of the buffer memory 8a. The region to be cleared is indicated by (b) in the diagram of FIG. 3. When the end address of the present line print data is equal to or larger than that of the previous line print data (S5: No), clearing operation of the buffer memory 8a is not performed and the routine proceeds to S7.

After the processing in S6 or when the end address of the previous line print data is equal to or larger than that of the present line print data (S5: No), the end address that has been stored in the RAM 8 is replaced with the end address of the present line print data (S7). Thereafter, when a print instruction is received from the host computer 2 (S8: Yes), printing is carried out based on the print data developed into the buffer memory 8a (S9). Determination is made as to whether or not one page worth of printing has been done (S10). If one page worth of printing has not yet been done (S10: No), the parameter "n" is incrementd by one (S11) and processings in S3 through S10 are repeatedly executed until one page worth of printing is carried out. When one page worth of printing is complete (S10: Yes), the process is ended.

A second embodiment of the present invention will be described with reference to the flowchart shown in FIG. 4.

When the printer 5 is powered and placed in an idling condition capable of accepting the print data from the host computer 2, all the storage regions of the buffer memory 8a are cleared (S20), whereupon the start address of the buffer memory 8a is stored in the RAM 8 (S21) as the end address of the 0-th line print data. This processing is necessary to determine the storage region to be cleared when the 1st line print data is developed into the buffer memory 8a.

When the 1st line (n=1) print data is received from the host computer 2, the CPU 6 develops the print data into the buffer memory 8a (S22, S23). Next, the end address of the 1st line print data is searched (S24) and determination is made as to whether or not the end address of the present line print data is smaller than that of the previous line ((n−1)th line) print data, i.e., 0-th print data (S25). Because the start address of the buffer memory 8a has been stored in the RAM 8 as the end address of the 0-th print data, it is always the case that the end address of the 1st line print data is equal to or larger than the end address of the previous line which in this case is equal to the start address of the buffer memory 8a, so that the determination made in S25 is "NO". Therefore, when the 1st line print data is developed into the buffer memory 8a, the clearing operation is not performed.

Next, the end address of the 1st line print data is stored in the RAM 8 (S27) without effecting the clearing operation of the RAM 8. Thereafter, when a print instruction is received from the host computer 2 (S28: Yes), printing is carried out based on the print data developed into the buffer memory 8a (S29). Determination is made as to whether or not one page worth of printing has been done (S30). If one page worth of printing has not yet been done (S30: No), the parameter "n" is incremented by one (S31) and the processings in S23 through S30 are repeatedly executed with respect to the next line (n=(n+1)th line). In the subsequent cycles of the routine from S23 through S30, when the end address of the present line print data is smaller than that of the previous line print data (S25: Yes), the storage region of the buffer memory 8a which remains unused in storing the present line print data but was used for the previous line print data, is cleared (S26) similar to the processing in S6 of the first embodiment. When one page worth of printing has been done, the routine of the FIG. 4 flowchart is ended.

While exemplary embodiments of this invention has been described in detail, those skilled in the art will recognize that there are many possible modifications and variations which may be made in these exemplary embodiments while yet retaining many of the novel features and advantages of the invention. For example, although the storage region of the buffer memory 8a that remains unused when developing the present line print data but used when the previous line print data was developed is cleared in S6 of the FIG. 2 flowchart and S26 of the FIG. 4 flowchart, a modification may be made so that entire storage region that remains unused when developing the present line print data is cleared, that is, the region indicated by (b) in FIG. 3 is cleared. Further, although in the above-described embodiments, the print data is developed into the buffer memory 8a on a line-by-line basis, the development of the print data may be made on a page-by-page basis if the host computer 2 transmits the print data on the same basis. In this case, the clearing operation is also carried out on the page-by-page basis.

As described above, according to the printer control device of the present invention, when the end position of the present line print data is smaller than the end position of the previous line print data that has been stored in the RAM 8, clearing operation is performed to clear the storage locations of the buffer memory 8a to which the present line print data does not extend but the previous line print data extends or to clear the storage locations of the buffer memory 8a which remain unused by the present line print data. In comparison with clearing operation performed by the conventional art, that is, clearing the whole storage region of the buffer memory, the clearing operation of the present invention can be achieved more quickly.

What is claimed is:

1. A printer control device comprising:
   a buffer memory for storing print data received from a host computer on a block-by-block basis, a present block of print data received from the host computer following a previous block of print data being overwritten on the previous block of print data; and
   clearing means for clearing a part of the previous block of print data which remains unerased as a result of overwrite of the present block of print data on the previous block of print data.

2. The printer control device according to claim 1, wherein said clearing means clears storage locations of said buffer memory which remain unused by the present block of print data.

3. The printer control device according to claim 1, further comprising determining means for determining whether or not there exists the part of the previous block of print data which remains unerased as a result of overwrite of the present block of print data on the previous block of print data, and control means for controlling said clearing means so as to be deactivated when said determining means determines that there does not exist the part of the previous block of print data which remains unerased.

4. A printer control device comprising:
   a first memory having predetermined storage locations assigned with consecutively increasingly numbered addresses from a start address to an end address, print data being received from a host computer on a block-by-block basis, a block of print data being developed into said first memory sequentially from the start address of said first memory;
   a second memory for storing an end address of an immediately preceding block of print data developed into said first memory, the immediately preceding block of print data being received from said host computer immediately preceding a present block of print data; and
   control means for controlling said first memory and said second memory so that when an end address of the present block of print data developed into said first memory is smaller than the end address stored in said second memory, at least storage locations of said first memory from the end address of the present block of print data to the end address stored in said second memory are cleared, and that the end address stored in said first memory is replaced with the end address of the present block of print data.

5. The printer control device according to claim 4, wherein when the end address of the present block of print data developed into said first memory is equal to or larger than the end address stored in said second memory, said control means carries out printing based on the present block of print data stored in said first memory without clearing the storage locations of said first memory.

6. The printer control device according to claim 4, further comprising initial setting means for initially setting said second memory to store the end address of said first memory as the end address of the immediately preceding block of print data so that determination can be made as to whether or not an end address of a firstly received block of print data is smaller than the end address stored in said second memory.

7. The printer control device according to claim 4, further comprising initial setting means for initially setting said second memory to store the start address of said first memory as the end address of the immediately preceding block of print data so that determination can be made as to whether or not an end address of a firstly received block of print data is smaller than the end address stored in said second memory.

8. The printer control device according to claim 4, wherein the print data is developed into said first memory on a line-by-line basis.

9. The printer control device according to claim 4, wherein when the end address of the present block of print data is smaller than the end address stored in said second memory, said control means clears storage locations of said first memory which remain unused by the present block of print data.

10. The printer control device according to claim 9, wherein when the end address of the present block of print data developed into said first memory is equal to or larger than the end address stored in said second memory, said control means carries out printing based on the present block of print data stored in said first memory without clearing the storage locations of said first memory.

11. The printer control device according to claim 9, further comprising initial setting means for initially setting said second memory to store the end address of said first memory as the end address of the immediately preceding block of print data so that determination can be made as to whether or not an end address of a firstly received block of print data is smaller than the end address stored in said second memory.

12. The printer control device according to claim 9, further comprising initial setting means for initially setting said second memory to store the start address of said first memory as the end address of the immediately preceding block of print data so that determination can be made as to whether or not an end address of a firstly received block of print data is smaller than the end address stored in said second memory.

13. The printer control device according to claim 9, wherein the print data is developed into said first memory on a line-by-line basis.

14. A method of controlling a printer, comprising the steps of:
(a) storing in a buffer memory print data received from a host computer on a block-by-block basis in such a manner that a present block of print data received from a host computer following a previous block of print data is overwritten on the previous block of print data; and
(b) clearing a part of the previous block of print data which remains unerased as a result of overwrite of the present block of print data on the previous block of print data.

15. The method according to claim 14, wherein step (b) clears storage locations of said buffer memory which remain unused by the present block of print data.

16. The method according to claim 14, further comprising steps of:
(c) determining whether or not there exists the part of the previous block of print data which remains unerased as a result of overwrite of the present block of print data on the previous block of print data; and
(d) skipping clearing operation when step (c) determines that there does not exist the part of the previous block of print data which remains unerased.

17. A method of controlling a printer that receives print data from a host computer on a block-by-block basis, comprising the steps of:

(a) initially storing an end address of a first memory in a second memory, said first memory having predetermined storage locations assigned with consecutively increasingly numbered addresses from a start address to the end address;
(b) setting a parameter n to 1;
(c) receiving an n-th block of print data from the host computer and developing the n-th block of print data into said first memory so as to overwrite the n-th block of print data on an (n−1)th block of print data previously stored therein;
(d) searching an end address of the n-th block of print data after developing the n-th block of print data into said first memory;
(e) determining whether or not the end address searched in step (d) is smaller than the address stored in said second memory;
(f) clearing the print data remaining in a storage region of said first memory when the determination made in step (e) is affirmative;
(g) replacing the address stored in said second memory with the end address searched in step (d);
(h) printing the block of data stored in said first memory;
(i) incrementing the parameter n to (n+1); and
(j) repeating the steps of (c) to (i).

18. A method of controlling a printer that receives print data from a host computer on a block-by-block basis, comprising the steps of:
(a) initially storing a start address of a first memory in a second memory, said first memory having predetermined storage locations assigned with consecutively increasingly numbered addresses from a start address to the end address;
(b) setting a parameter n to 1;
(c) receiving an n-th block of print data from the host computer and developing the n-th block of print data into said first memory so as to overwrite the n-th block of print data on an (n−1)th block of print data previously stored therein;
(d) searching an end address of the n-th block of print data after developing the n-th block of print data into said first memory;
(e) replacing the address stored in said second memory with the end address searched in step (d);
(f) printing the block of data stored in said first memory;
(g) incrementing the parameter n by one;
(h) receiving an n-th block of print data from the host computer and developing the n-th block of print data into said first memory so as to overwrite the n-th block of print data on an (n−1)th block of print data previously stored therein;
(i) searching an end address of the n-th block of print data after developing the n-th block of print data into said first memory;
(j) determining whether or not the end address searched in step (i) is smaller than the address stored in said second memory;
(k) clearing the print data remaining in a storage region of said first memory when the determination made in step (e) is affirmative;
(l) replacing the address stored in said second memory with the end address searched in step (i);
(m) printing the block of data stored in said first memory;
(n) incrementing the parameter n by one; and
(j) repeating the steps of (h) to (n).

* * * * *